United States Patent [19]

Salvia

[11] 4,130,088
[45] Dec. 19, 1978

[54] SHIPPING CAGE FOR FEEDING ANIMALS WATER FROM DISPOSABLE BAGS

[76] Inventor: Matthew Salvia, Cold Spring Rd., Stanfordville, N.Y. 12581

[21] Appl. No.: 776,523

[22] Filed: Mar. 11, 1977

Related U.S. Application Data

[63] Continuation-in-part of Ser. No. 632,626, Nov. 17, 1975, Pat. No. 4,022,159, which is a continuation-in-part of Ser. No. 517,509, Oct. 24, 1974, Pat. No. 3,958,535.

[51] Int. Cl.² ............................ A01K 1/02; A01K 9/00
[52] U.S. Cl. ......................................... 119/19; 119/71; 119/72.5; 222/88
[58] Field of Search ........................... 119/19, 71, 72.5; 222/88, 89, 90

[56] References Cited

U.S. PATENT DOCUMENTS

| 2,708,421 | 5/1955 | Jauch | 119/71 |
| 3,581,713 | 6/1971 | Crooks | 119/72.5 |
| 3,703,159 | 11/1972 | Rose-Miller | 119/19 |
| 3,762,606 | 10/1973 | Lande | 222/88 |

Primary Examiner—Louis G. Mancene
Assistant Examiner—Daniel J. Leach
Attorney, Agent, or Firm—Bernard Stickney

[57] ABSTRACT

A shipping cage for animals having secured to an interior wall a receptacle containing a disposable bag of sterile water. A demand feeding valve having a piercing point is inserted into the bag through the wall of the receptacle and has intermediate integral retaining flanges on the valve which secure it to said wall.

2 Claims, 3 Drawing Figures

SHIPPING CAGE FOR FEEDING ANIMALS WATER FROM DISPOSABLE BAGS

This is a continuation-in-part of U.S. application Ser. No. 632,626, filed Nov. 17, 1975, now U.S. Pat. No. 4,022,159, issued May 10, 1977, which is a continuation-in-part of Ser. No. 517,509, filed Oct. 24, 1974, now U.S. Pat. No. 3,958,535 issued May 25, 1976.

BACKGROUND OF THE INVENTION

As discussed in my U.S. Pat. Nos. 3,958,535 and 4,022,159, it was essential that animals being used in controlled scientific experiments have sterile water available at all times. A corollary of that general problem was the one involving the shipment of animals from the breeders to the laboratories conducting the experiments. In the prior art, pieces of vegetables, fruits or canned gel diets were used in the expectation that the animals in eating these materials would obtain sufficient liquid to survive during the period of travel. The latter patent disclosed as an alternative solution, the use of disposable bags of sterile water located in a compartment attached to a shipping cage and a demand feeding valve having a piercing point inserted into the bag.

Accordingly it is the primary object of this invention to provide an improved and simplified arrangement for securing a feeding valve to a compartment in a shipping cage.

Another object of this invention is to provide a demand feeding valve having integral retaining flanges.

A still further object of this invention is to provide an improved compartment attached to a shipping cage for containing a disposable bag of sterile water.

BRIEF DESCRIPTION OF THE DRAWINGS

These and other objects and advantages of the invention will subsequently become apparent from the following detailed description when read in conjunction with the accompanying drawings wherein.

DETAILED DESCRIPTION OF THE INVENTION AND DRAWINGS

Figure 1:
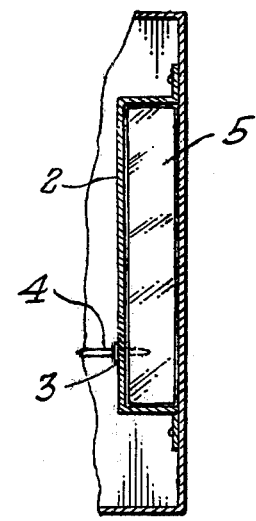
FIG. 1 is a sectional view of a receptacle secured in a shipping cage and containing a bag of water and valve in feeding position.

Referring now more specifically to the drawings, FIG. 1 shows a simplified representation of a corrugated paper shipping container for animals having a corrugated paper receptacle 2 secured to an interior wall by staples. This concept is more specifically disclosed in my U.S. Pat. No. 4,022,159. In the present instance, however, a demand feeding valve 4 is pierced through a continuous wall of the receptacle, forming a hole 3 rather than through a previously formed opening. A disposable plastic bag containing sterile water 5 is thus pierced for dispensing water on demand.

Figure 2:
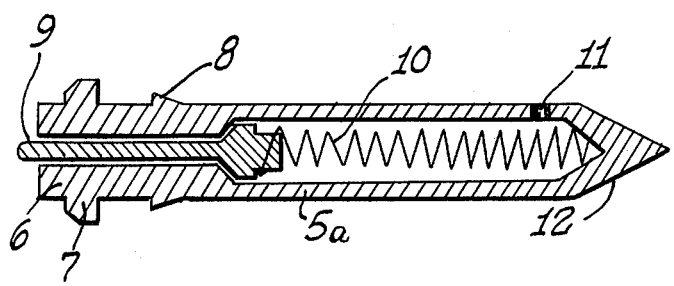
FIG. 2 is an enlarged sectional view of the demand feeding valve.

The feeding valve is secured to the receptacle by its structure as shown in FIG. 2. The feeding valve has a housing 5a with a feeding end 6 which in this form is shorter in length than that of FIG. 1. Integrally formed in the housing are retaining flanges 7 and 8. A pin 9 is received in a drilled bore in the feeding end while a spring 10 provides tension on the pin. A transverse opening 11 in the wall of the housing is preferred to an opening which may also be provided at the pointed end 12, since in the piercing operation material might clog the opening.

In positioning the feeding valve, a handle tool (not shown) having a bore to receive feeding end of the valve is used to plunge the valve through the wall of the receptacle until it is stopped by flange 7. The bevelled flange 8 is retained between the laminations of the corrugated wall of the receptacle to prevent withdrawal of the valve during feeding. In this form the overall length of the housing is 1¼ inches.

Figure 3:
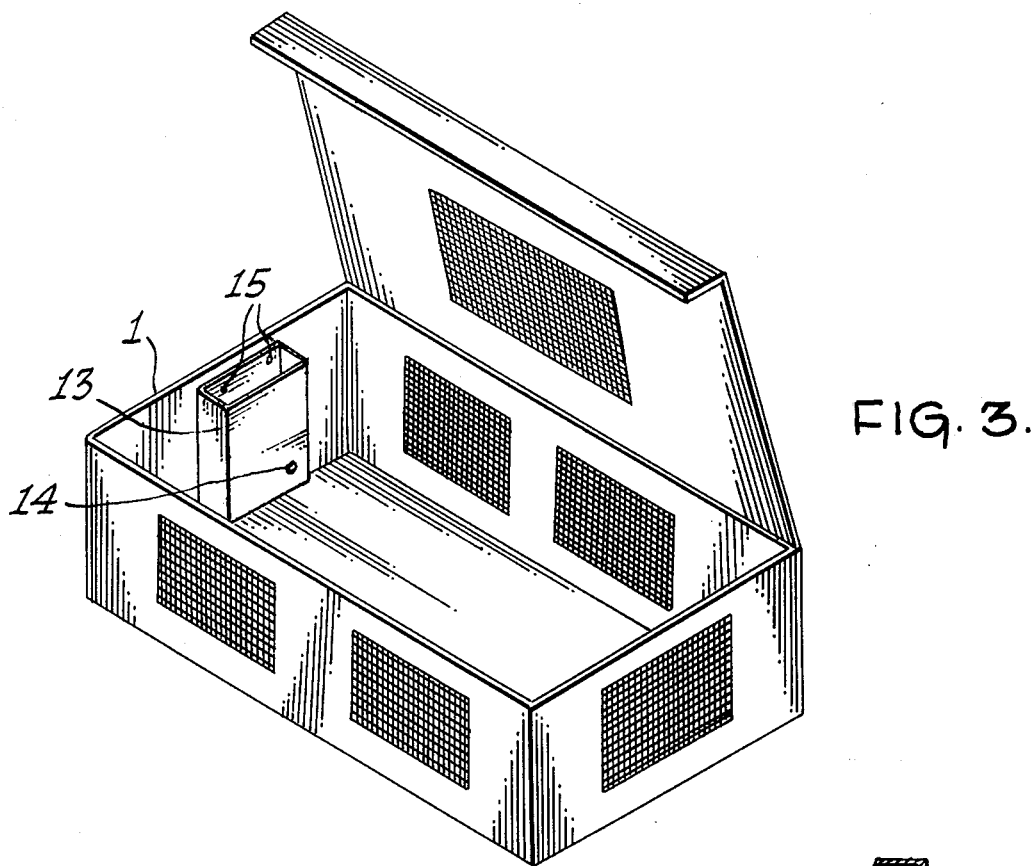
FIG. 3 is a perspective view of a shipping cage with another form of receptacle.

In FIG. 3 is shown another form of a receptacle 13 secured by staples 15 to the interior wall of shipping cage1. This receptacle is made of plastics such as polyethylene or polypropylene and has a hole 14 smaller than the outside diameter of the housing of the feeding valve. When the valve has been positioned in the manner described above, the inherent elasticity of the plastic will serve to grip the housing portion between retaining flanges 7 and 8 while the latter will still provide its function of withdrawal prevention. To protect the receptacle from the claws and teeth of animals, mesh wire may be placed around it and secured to the walls of the cage.

The improvement in the art of shipping animals by using receptacles containing disposable bags of water with piercing demand feeding valves, termed "water kits," may be ascertained from the following excerpts of a study made by Taconic Farms Inc. of Germantown, N.Y. under the direction of Richard G. Paganelli, Sales and Technical Director.

It is commonly recognized that the shipment of laboratory animals from the breeder to the research laboratory imposes "stress" on the shipped animals. Although this is recognized on an intuitive level, and buyers of animals typically recommend delaying the onset of experimental protocols to give the animals time to "equilibrate", little research has been published on the physiological expression of "stress."

The results will indicate that at least two of the stressors during the period of shipment are (a) dehydration due to absence of water and (b) starvation. Since it is known that rodents with restricted water supplies rapidly become anorrhexic, it is suggested that starvation during shipment, even in the presence of food, is secondary to deprivation of water.

Various materials have been used to provide nutrition and/or water to rodents during the shipment period. They include fresh fruits such as apples, potatoes, canned carnivore diets with high water content, and gelled rodent diets with high water content packaged in cans and foil pouches, and still others. Water itself has not previously been provided to rodents during the shipment period due to an inability (on both economic and technical criteria) to solve the containerization and delivery problems. Recent development of an inexpensive and technically practical means of providing water, either plain or treated, delivered by an automatic valve, has permitted a solution to the containment and delivery problems. Detailed below are comparisons of mice shipped under identical conditions, varying only in the form of nutrient and water supply.

MATERIALS AND METHODS

Animals: Groups of mice (TAC:SW fBR) were established varying only in the type of food and/or water source provided, and subjected to one of two shipping modes. Tables 1 and 4, ahead, report results of shipping boxes containing 100 mice each, on commercial public carriers between breeder and research laboratory. The total duration of this trip was 75 hours, or just over 3 days, an unusually extended shipment period. Individual animal weights were recorded prior and subsequent to shipment.

The other shipment mode entailed loading the boxed animals at Taconic Farms onto a vendor-owned transport vehicle with environmental controls over temperature and humidity. The truck was sent on a trip lasting 12 hours, the animals held for a static period of 60 hours, and then unboxed and recaged with food and water available ad libitum. The individual animal weights were recorded prior to shipment, after shipment, and on the 4th and 7th days after shipment and are tabulated ahead in Tables 2 and 3.

Nutrient and Water Supply: In these experiments, packed shipping boxes of mice were provided with water kits, potatoes or a canned gel diet as alternative water sources. The water kits refer to a recently developed, disposable pre-packaged system employing plastic pouches holding about ½ liter of water delivered ad libitum to the animals by means of a disposable drinking valve. The canned rodent diet contained 69% water bound in a gel form. Potatoes were not evaluated for water content. Food was supplied to the water pouch and potato groups in the form of a commercial rodent pelleted diet (Wayne Lab Blox, 5% water) in variable amounts, as indicated in the tabulated results. The canned gel diet was believed to be a complete diet and these boxes were not additionally supplied with food.

RESULTS

The results for the first shipping mode (i.e., 75 hour trip from Taconic Farms to the HSC, Stony Brook, via commercial public carriers) are tabulated in Tables 1 and 4, with statistical analyses in Table 4. With regard to the mice (Tables 1 and 4) it may be seen the least weight loss was observed for both initial groups (14.5 and 15.5) on the water pouch system. The weight in this group after shipping was significantly higher than those groups receiving either potatoes or canned gel diet as a water source. The groups receiving potatoes weighed significantly more than those on the canned gel diet after shipping. Interestingly, it is additionally pointed out that the variability in the weight after shipping (as reflected by the standard deviation) was more in the groups on potatoes (1.25 and 1.18) than it was in the groups on water pouches (0.976 and 0.831). Under the conditions of this experiment, the gel diet and potatoes were entirely consumed prior to the end of the shipment period, whereas small quantities of available water remained in the boxes with water pouches.

Tables 2, 3 and 4 summarize the data obtained and the statistical analysis of mice shipped via the second mode (i.e. vendor-owned vehicle trip of 12 hours, 60 hour static period, return to Taconic Farms) which were held for 7 days after the shipment period. It will be seen that Tables 2 and 3 describe experiments that differ primarily by the amount of food provided (600 vs 1200 gm of pelleted diet), and also, in the amount of water source provided (410 vs 820 gm potatoes, 933 vs 1865 gm canned gel diet). These experiments are referred to as restricted and unrestricted diets, respectively, in Tables 2 and 3. With regard to restricted diets (Table 2), it may be seen that those groups on water pouch systems lost significantly less weight (in some cases increased) by the end of the shipment period compared to those groups on potato or gel diet water sources.

For all practical purposes, the differences between groups were abolished by the 7th day after shipping, although it may be noted that the 15.5 group on water pouches was still significantly heavier (P 0.005) than its counterpart groups receiving potatoes or gel diet during shipment. The groups receiving potatoes weighed significantly more subsequent to shipping than those receiving gel diets, but similarly, this difference became insignificant by the 7th day after receipt.

When the same groups were established using unrestricted levels of diet and water source, the same ranking obtained; i.e., those groups on the water pouch system weighed significantly more than those on either potato or gel diet water source, and also, those groups on potatoes weighed significantly more than those receiving the gel diet. Similarly, these differences were abolished, and the weight differences made up by the 7th day after receipt as to be insignificant. No differences in variability (as reflected in the standard deviation) were observed in either of the groups in the second treatment mode. It should be noted that although 1865 gm of gel diet and 820 gm of potatoes were provided for these groups in the "unrestricted" diet experiment, these supplies were entirely consumed in the 72 hour shipment period.

Data provided in Tables 1-3 has been graphed in the corresponding FIGS. 1-3 to provide visualization of the dynamics of weight changes during and subsequent to the shipment period. As a general statement, it may be said that all groups lose weight during the shipment period, although it is true that those provided with water itself lose significantly less than those on the other water sources investigated. This is particularly true in the comparison to groups not shipped at all, and without this interruption in the normal growth pattern. In comparison, the latter mice start out at the same point, but over the same 3-day period continue to increase in weight to about 17 gm. All shipment groups rapidly regain the lost weight by the 7th day after receipt so as to become insignificantly different in terms of weight; although they may still weigh less than those mice of comparable starting weights that were never shipped at all (19–20 gm for shipped mice compared to 21 gm for unshipped mice). These results indicate that full recovery may take at least 7 days and form the basis for recommending a 7-day equilibration period following extended shipment periods.

DISCUSSION

The results of this experiment indicate that there may be no ideal shipment mode that would result in mice received no different from those not shipped at all. Although this ideal may never be reached in the sense that any degree of shipment imposes physiological stress reflected in weight loss or temporarily impeded growth rate, it is clear that prevention of dehydration by the provision of water itself will significantly reduce stress factors attributable to shipment. The disposable water pouch system with automatic drinking valve offers a practical and economical means of providing water during shipment. Mice receiving water by this means weighed significantly more on receipt, looked cleaner and more physically even when unboxed after shipment, and made a more effective recovery following shipment in many cases.

TABLE 1
Effects of public carrier transportation on shipped mice

| type of water source | measured component | Group No. | Weight** at start mean SD SE | Weight** at finish mean SD SE | Weight Change |
|---|---|---|---|---|---|
| water kit | mice* | 1 | 14.51 .281 .026 | 14.52 .976 .094 | (+) 0.01 |
|  | mice | 5 | 15.53 .285 .028 | 14.46 .831 .077 | (−) 1.07 |
|  | water kit | 1 | 900 | 336 | 564 |
|  | water kits | 5 | 1020 | 269 | 751 |
|  | feed | 1 | 1200 | 150 | 1050 |
|  | feed | 5 | 1200 | 115 | 1085 |
| potatoes | mice | 2 | 14.50 .272 .018 | 13.06 1.25 .122 | (−) 1.44 |
|  | mice | 4 | 15.50 .290 .026 | 13.83 1.18 .114 | (−) 1.67 |
|  | potatoes | 2 | 820 | 29 | 791 |
|  | potatoes | 4 | 820 | 12 | 808 |
|  | feed | 2 | 1200 | 148 | 1052 |
|  | feed | 4 | 1200 | 272 | 928 |
| canned gel diet | mice | 3 | 15.50 .277 .020 | 12.43 .821 .077 | (−) 3.07 |
|  | mice | 6 | 14.50 .266 .016 | 11.57 .689 .063 | (−) 2.93 |
|  | canned diet | 3 | 1900 | 0 | 1900 |
|  | canned diet | 6 | 1900 | 0 | 1900 |

*N-100 each group.;
**-all weights in gm

TABLE 2
Effects of vendor transportation on shipped mice with restricted diets

| Type of water source | measured component | weight** at start mean SD SE | weight** at finish mean SD SE | weight change | weight 4 days after finish mean SD SE | weight change +4 days | weight 7 days mean SD SE | weight change +7 days |
|---|---|---|---|---|---|---|---|---|
| water kit | mice A* | 14.50 .275 .019 | 14.83 .831 .077 | (+)0.33 | 17.72 1.43 .141 | (+)3.1 | 18.6 2.03 .202 | 3.9 |
|  | mice B | 15.50 .271 .018 | 15.29 .656 .063 | (−)0.21 | 18.80 1.45 .144 | (+)3.5 | 19.7 2.29 .230 | 3.8 |
|  | water kit | 1006 | 366 | 640 |  |  |  |  |
|  | water kit | 962 | 284 | 678 |  |  |  |  |
|  | feed | 600 | 0 | 600 |  |  |  |  |
|  | feed | 600 | 0 | 600 |  |  |  |  |
| potatoes | mice C | 14.55 .290 .036 | 12.28 .448 .044 | (−)2.27 | 17.2 1.47 .144 | (+)2.6 | 18.8 1.89 .189 | 4.3 |
|  | mice D | 15.52 .288 .025 | 12.34 .512 .044 | (−)3.16 | 17.6 1.69 .167 | (+)2.1 | 18.6 2.11 .214 | 3.4 |
|  | potatoes | 410 | 0 | 410 |  |  |  |  |
|  | potatoes | 410 | 0 | 410 |  |  |  |  |
|  | feed | 600 | 0 | 600 |  |  |  |  |
|  | feed | 600 | 0 | 600 |  |  |  |  |
| canned gel diet | mice E | 14.50 .270 .018 | 12.17 .711 .070 | (−)2.30 | 17.24 1.53 .151 | (+)2.7 | 18.4 2.24 .223 | 3.9 |
|  | mice F | 15.50 .275 .020 | 12.30 .644 .063 | (−)3.20 | 17.51 1.61 .161 | (+)2.0 | 18.752 2.39 .238 | 3.2 |
|  | canned diet | 933 | 0 | 933 |  |  |  |  |
|  | canned diet | 933 | 0 | 933 |  |  |  |  |

*N-100 each group;
**-all weights in gm

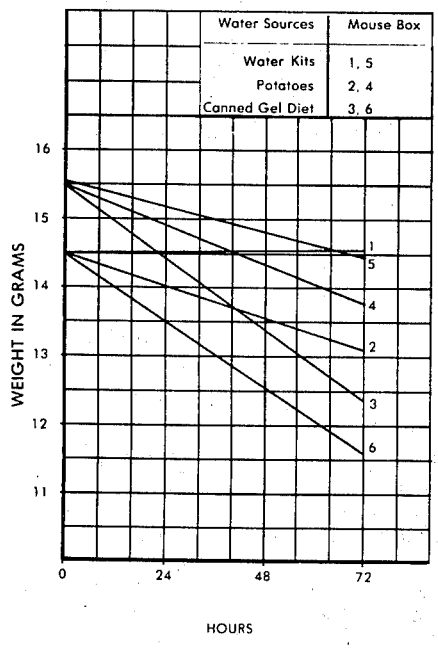

DATA FROM TABLE 1

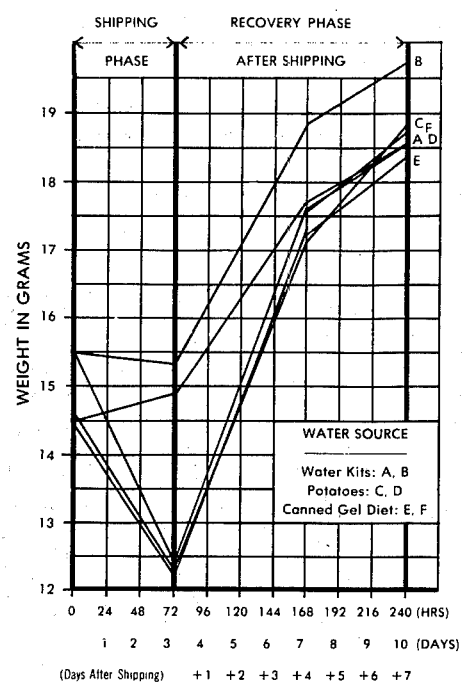

DATA FROM TABLE 2

TABLE 3

Effects of vendor transportation on shipped mice with unrestricted diets

| Type of water source | measured component | weight** at start mean SD SE | weight** at finish mean SD SE | weight change | weight 4 days after finish mean SD SE | wt. change + 4 days | weight 7 days mean SD SE | wt. change + 7 days |
|---|---|---|---|---|---|---|---|---|
| water kit | mice* G | 14.50 .276 .022 | 14.95 .772 .077 | (+)0.45 | 17.2 1.89 .189 | (+)2.7 | 18.39 2.38 .238 | 3.89 |
| | mice H | 15.50 .266 .020 | 15.67 1.07 .108 | (+)0.17 | 17.9 1.76 .176 | (+)2.4 | 19.55 2.17 .217 | 4.05 |
| | water kit | 978 | 390 | 588 | | | | |
| | water kit | 998 | 500 | 498 | | | | |
| | feed | 1200 | 530 | 670 | | | | |
| | feed | 1200 | 480 | 720 | | | | |
| potatoes | mice I | 14.51 .280 .024 | 12.97 .630 .054 | (−)1.5 | 17.37 1.474 .144 | (+)2.9 | 19.41 2.003 .200 | 4.91 |
| | mice J | 15.51 .276 .022 | 13.82 .645 .069 | (−)1.7 | 17.49 2.031 .204 | (+)1.9 | 19.44 2.387 .024 | 3.93 |
| | potatoes | 820 | 0 | 820 | | | | |
| | potatoes | 820 | 0 | 820 | | | | |
| | feed | 1200 | 420 | 780 | | | | |
| | feed | 1200 | 360 | 840 | | | | |
| canned gel diet | mice K | 14.51 .266 .020 | 14.52 .836 .083 | 0.0 | 17.48 1.891 .194 | (+)2.4 | 19.23 2.333 .240 | 4.72 |
| | mice L | 15.50 .288 .025 | 15.03 .809 .081 | (−)0.47 | 18.27 1.768 .176 | (+)2.7 | 20.14 2.180 .220 | 4.64 |
| | canned diet | 1865 | 0 | 1865 | | | | |
| | canned diet | 1865 | 0 | 1865 | | | | |

*N-100 each group;
**-all weights in gm

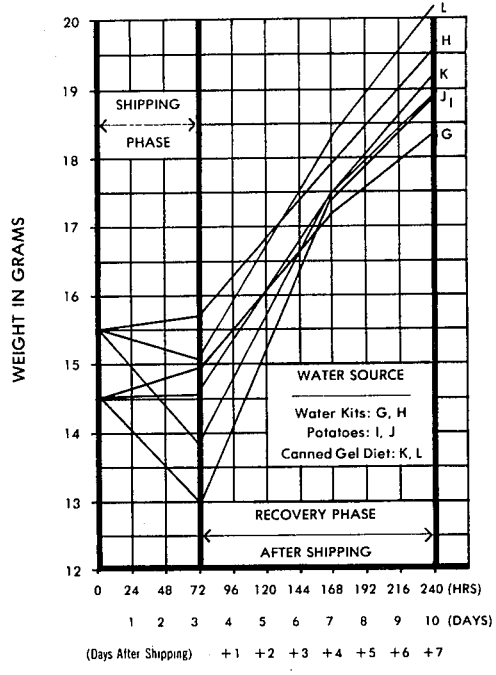

DATA FROM TABLE 3

WATER SOURCE
Water Kits: G, H
Potatoes: I, J
Canned Gel Diet: K, L

TABLE 4

Analysis of groups means (by Student's "+") of data on shipped mice from Tables 1-3

| Table | Groups compared | "+" value | Significance |
|---|---|---|---|
| 1 | 1 vs 2 | 9.512 | P<0.001 (S) |
| | 1 vs 3 | 17.13 | P<0.001 (S) |
| Weight at finish (after shipping) | 2 vs 3 | 4.340 | P<0.001 (S) |
| | 5 vs 4 | 4.554 | P<0.001 (S) |
| | 5 vs 6 | 28.85 | P<0.001 (S) |
| | 4 vs 6 | 17.39 | P<0.001 (S) |
| 2 | A vs C | 28.59 | P<0.001 (S) |
| | A vs E | 25.70 | P<0.001 (S) |
| Weight at finish (after shipping) | C vs E | 11.39 | P<0.001 (S) |
| | B vs D | 38.11 | P<0.001 (S) |
| (recovery) | B vs F | 29.54 | P<0.001 (S) |
| | D vs F | 3.974 | P<0.001 (S) |
| | A vs C | 0.483 | (NS) |
| | A vs E | 0.767 | (NS) |
| | C vs E | 1.245 | (NS) |
| | B vs D | 3.200 | 0.005<P>0.001 (S) |
| | B vs F | 2.990 | 0.005<P>0.001 (S) |
| | D vs F | 0.031 | (NS) |
| 3 | G vs I | 21.06 | P<0.001 (S) |
| | G vs K | 3.771 | P<0.001 (S) |

TABLE 4-continued

Analysis of groups means (by Student's "+") of data on shipped mice from Tables 1-3

| Table | Groups compared | "+" value | Significance |
|---|---|---|---|
| Weight at finish (after shipping) | I vs K | 15.06 | P<0.001 (S) |
| | H vs J | 14.41 | P<0.001 (S) |
| | H vs L | 4.707 | P<0.001 (S) |
| | J vs L | 11.34 | P<0.001 (S) |
| 3 | G vs I | 3.308 | 0.005<P>0.001 (S) |
| | G vs K | 2.471 | NS |
| weight 7 days | I vs K | 0.6100 | NS |
| after shipping | H vs J | 0.3410 | NS |
| (recovery) | H vs L | 1.881 | NS |
| | J vs L | 2.120 | NS |

*S-Significant difference between groups; NS-Insignificant difference. Values of P more than 0.01 were considered insignificant.

While the significance of the present invention is readily apparant in the shipment of laboratory animals, as above, it also would obviously be beneficial in the shipment of all other animals such as pets.

The receptacles are shown as secured to interior walls of the cage. There may also be cages with subdividing portions or walls to which the receptacles can be secured. Other modifications and variations may be made in the details of construction, but it is understood that such changes will be made within the spirit and scope of the present invention.

I claim:

1. A shipping cage made of laminated corrugated paper for feeding animals liquids while in transit (have) having a cover,
  receptacle means made of laminated corrugated paper secured to a wall within said cage,
  a sealed plastic bag of liquid within said receptacle means,
  a feeding means having a demand feeding means at one end and a piercing point at the other end extending through said (wall) receptacle means and into the bag,
  and integral (retaining means) spaced flanges intermediate the ends of the feeding means, one of the flanges being retained between the laminations of the receptacle means and the other abutting its wall through which the clemand feeding means protrudes to prevent withdrawal of the feeding means by the animals.

2. A shipping cage made of laminated corrugated paper for feeding animals liquids while in transit, having a cover, plastic receptacle means secured to a wall within said cage, a sealed plastic bag of liquid within said receptacle means, a feeding means having a demand feeding means at one end and a piercing point at the other end extending through said receptacle means and into the bag, and integral spaced flanges intermediate the ends of the feeding means, a wall of the receptacle means being retained between the flanges to prevent withdrawal of the feeding means by the animals.

* * * * *